E. H. WAUGH.
SCRAPER FOR FISH CLEANING MACHINES.
APPLICATION FILED MAR. 31, 1919.

1,322,740.

Patented Nov. 25, 1919.
4 SHEETS—SHEET 1.

INVENTOR.
EDWARD H. WAUGH
BY
Reynolds & Cook.
ATTORNEY

E. H. WAUGH.
SCRAPER FOR FISH CLEANING MACHINES.
APPLICATION FILED MAR. 31, 1919.

1,322,740.

Patented Nov. 25, 1919.
4 SHEETS—SHEET 2.

INVENTOR
EDWARD H. WAUGH
BY
Reynolds & Cook
ATTORNEY

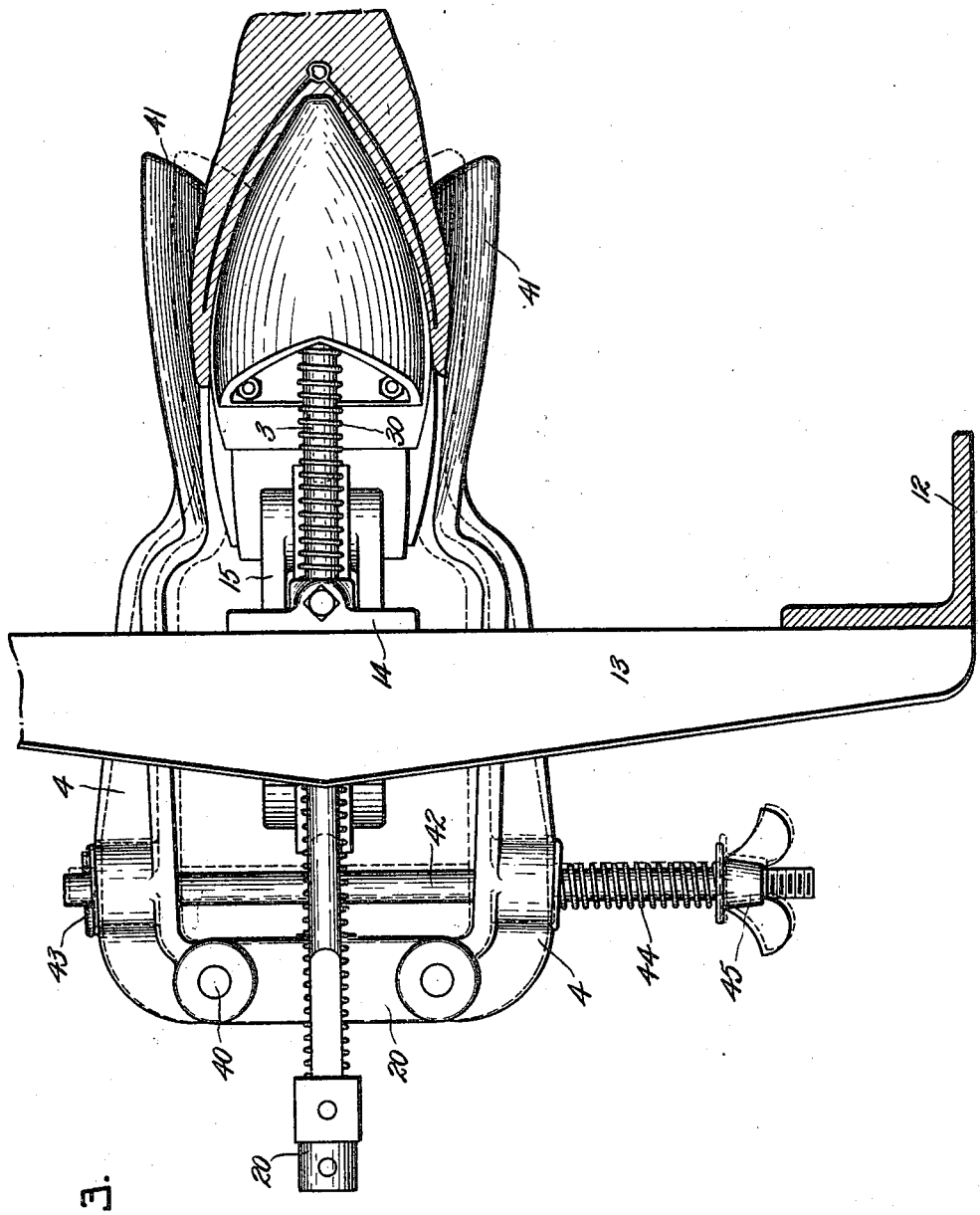

E. H. WAUGH.
SCRAPER FOR FISH CLEANING MACHINES.
APPLICATION FILED MAR. 31, 1919.

1,322,740.

Patented Nov. 25, 1919.
4 SHEETS—SHEET 4.

INVENTOR
EDWARD H. WAUGH
BY
Reynolds & Cook
ATTORNEY

UNITED STATES PATENT OFFICE.

EDWARD H. WAUGH, OF SEATTLE, WASHINGTON, ASSIGNOR TO SMITH CANNERY MACHINES CO., OF SEATTLE, WASHINGTON, A CORPORATION OF WASHINGTON.

SCRAPER FOR FISH-CLEANING MACHINES.

1,322,740.   Specification of Letters Patent.   Patented Nov. 25, 1919.

Application filed March 31, 1919. Serial No. 286,478.

*To all whom it may concern:*

Be it known that I, EDWARD H. WAUGH, a citizen of the United States, and resident of the city of Seattle, county of King and State of Washington, have invented certain new and useful Improvements in Scrapers for Fish-Cleaning Machines, of which the following is a specification.

My invention relates to fish cleaning machines and more particularly to an improved type of scraper which acts upon the inner walls of the abdominal cavities of the fish to finish the cleaning thereof. My invention consists in this improved scraping mechanism, which is applied to the fish, to more thoroughly and perfectly clean the abdominal cavity of the fish.

This invention has been designed more particularly to be used upon a type of fish cleaning machine such as that shown in the patents to E. A. Smith No. 998,129 of July 18, 1911, and 1034525 of August 6, 1912. I have herein illustrated my invention as applied to a machine of this character. It is, however, evident that the device may be applied to other machines wherein the methods of operation are such as to in any way resemble that employed by this machine. In other words, the device which is the subject of this invention may be applied so as to act upon the fish being handled by any type of fish cleaning machine wherein the fish is presented in such a way as to make the device applicable.

My invention consists of the novel features of construction and the combination of parts which will hereinafter be described and then particularly defined by the claims.

In the accompanying drawings, I have shown my invention embodied in the form of construction which is now most preferred by me.

Fig. 3 is a top or plan view of one of these devices.

Figure 1:
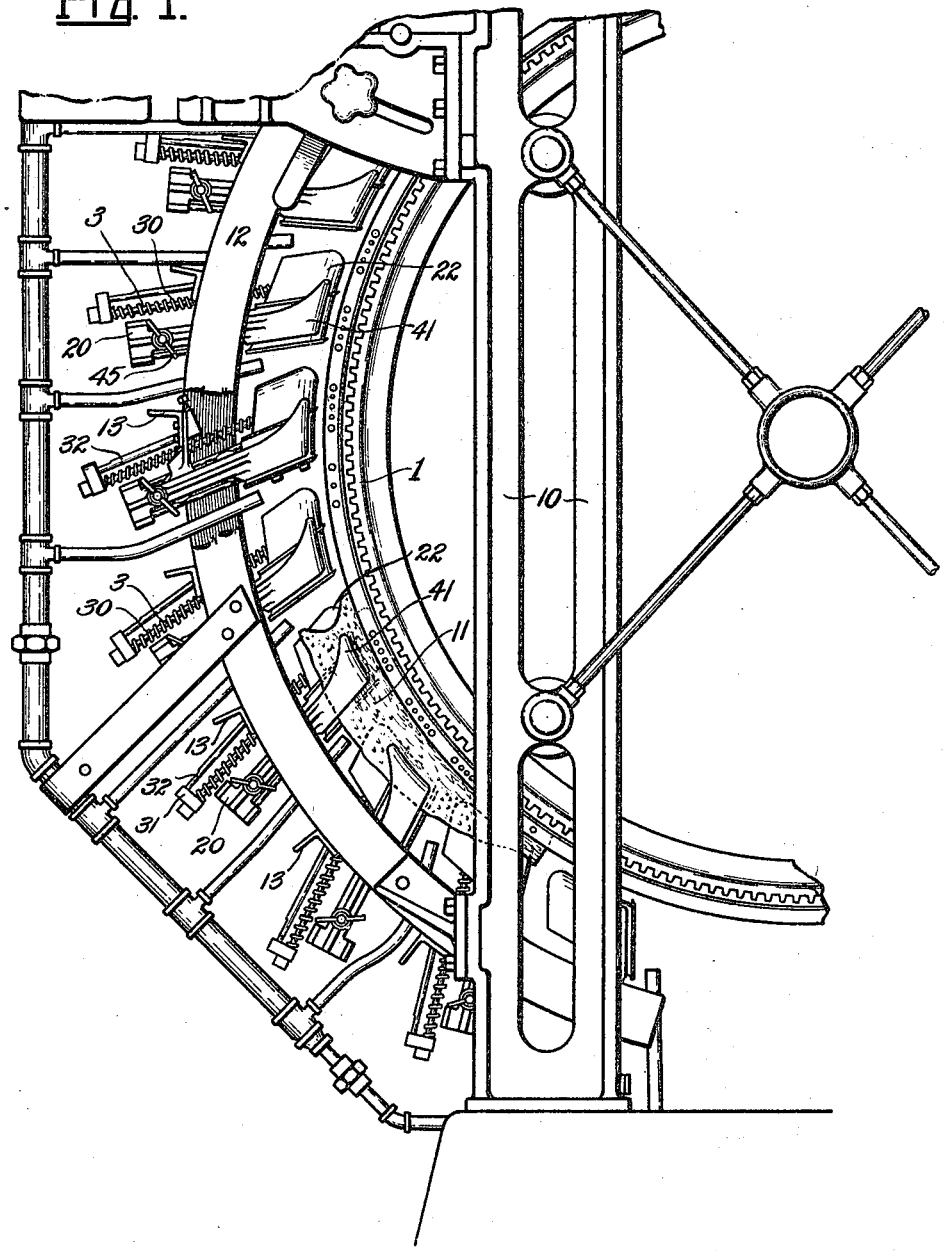
Figure 1 is a side elevation of a portion of a fish cleaning machine of the type referred to, showing my devices as applied thereto and showing its general relation to the other parts of the apparatus.

In the type of fish cleaning machine such as is represented by the Smith patents referred to and connected with which I have illustrated my invention, two revolving rings 1 are employed, these being slightly separated in the direction of their axes and provided with means for holding the fish between them at their periphery. In the machine in question, the fish is carried by the rings 1 and presented to the apparatus which acts thereon, tail end first. The preliminary operations consist in the removal of the tail and fins, the slitting of the abdomen of the fish, and the removal of the contents of the abdominal cavity. It is then acted upon by various mechanisms having for their object the more perfect cleaning of the fish. The device which is the subject of this invention performs the latter part of the cleaning operation upon the fish.

The frame 10 of the machine may be of any shape and form of construction which is found suitable. Secured to or formed as a part thereof, are two circular segment bars 12 located one at each side of the machine. These form the supports which carry the devices which form the subject of this invention. I prefer to apply a number of these devices so as to act upon the fish in succession and thereby secure a more perfect job of cleaning the fish.

The two bars 12 are separated at some little distance from each other. Bars 13 extend across at intervals between these and serve as the immediate support for the cleaning devices. Secured to the bar 13 is a flange 14, extending outward from a casting which has arms 15 extending in a direction which is approximately radial to the circle. These arms have two small rollers 16 journaled thereon and in alinement. These form the guide members upon which the immediate frame or support of the cleaning members may reciprocate. These rollers are placed at a slight angle to a true radius from the circle, the angle being approximately 20° and the direction of inclination being such that the outer ends thereof are inclined away from the radius in the same direction in which the fish is passing while being cleaned.

Two rods 2 are mounted so as to fit in the grooves of the pulleys 16 at the opposite sides thereof. At one end these are secured together by the members which form the scraping head and at the other by a connecting block 20.

Figure 2:
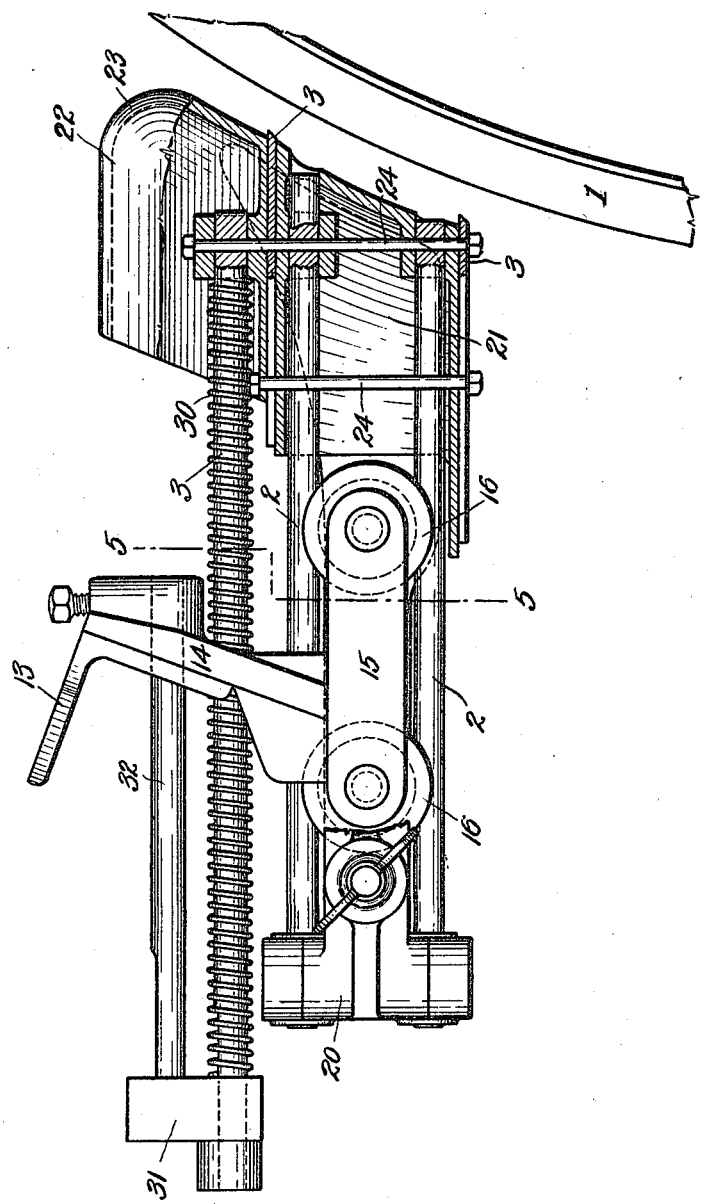
Fig. 2 is a side elevation with the scraping parts in section, showing one of my devices and its relation to the revolving ring-like frame which carries the fish.
Figure 5:
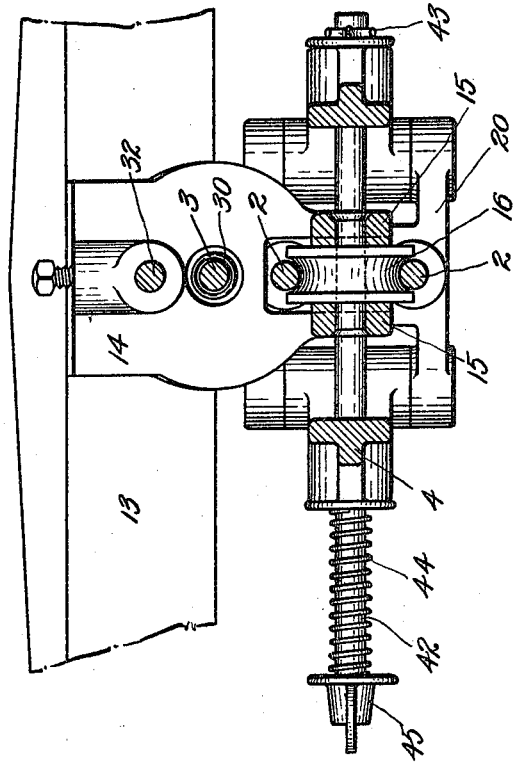
Fig. 5 is a transverse section taken upon the broken line 5—5 of Fig. 2.
Figure 4:
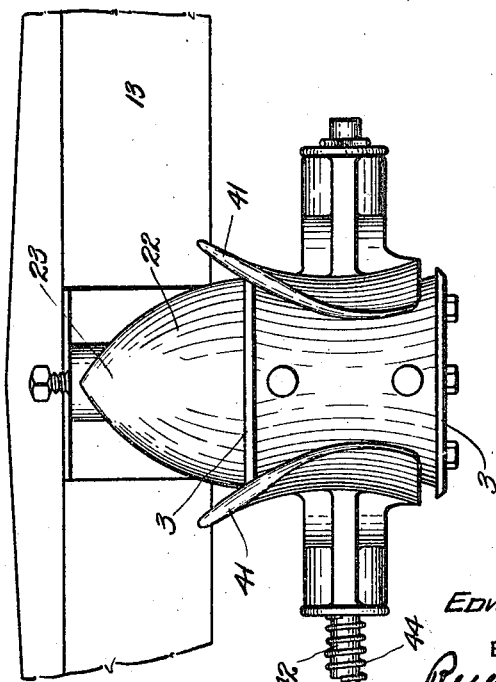
Fig. 4 is an end view of one of these devices, showing the end which is toward the body of the machine.

The scraping head is of compound construction. It has two hollow castings 21 and 22 which are shaped to resemble in outline that of the cavity existing between the sides or flanks of the fish. The first one of these to engage the fish, the section 22 has its front end tapered, so as to form a rather blunt conical end for the head. The shape of this is clearly shown in Fig. 2 to thereby facilitate its entrance into the abdominal cavity of the fish.

This cleaning head is provided with scraping flanges which project slightly beyond the surface of the main body of the head. These are preferably provided by the use of plates 3 of which one is inserted between the two sections 21 and 22 and the other is secured to the rear face of the section 21. By this means it is possible to use for these scrapers steel which can be tempered and which can be both adjusted and sharpened whenever this is desired, while the two members 21 and 22 may be made as a casting. These various parts may be secured together as by bolts 24.

A rod 3 is secured to the scraper head and extends outwardly in parallelism with the rods 2. At its outer end it passes through a guide member 31, carried by a rod 32 which is supported in any suitable way from the cross member 14 and the supporting bar 13. Between the guide member 31 and the scraper head, the rod 3 is surrounded with a spring 30 which acts to hold the scraper head yieldingly toward the fish carrying rings 1 and the fish carried thereon and yet which permits the recession of the scraping device upon contact with a fish.

The member 20 which secures the outer ends of the guide rods 2, has lateral extensions upon which, at 40, are pivoted two presser levers 4. These have curved plates 41 upon their inner end, so shaped as to engage with the outer surfaces of the sides of the fish and to hold these gently to the scraper head. These sides or flanks of the fish enter between the presser plates 41 and the scraper head, as is clearly shown in Fig. 3.

The two arms 4 are connected by a rod 42 which is engaged with one of the arms 4 by means of a pin 43 or in any other suitable manner which will permit of a slight rocking or pivotal movement. The rod 42 passes through an opening in the opposite arm 4 and projects through the same a sufficient distance to provide room for the reception of a spring 44 and a thumb nut 45, by which means the two arms are held in a yielding manner toward each other and so as to secure the yielding pressure of the plates 41 upon the flanks of the fish. This pressure may be adjusted as desired.

It is evident that the manner of securing the yielding pressure of the head toward the fish and also the yielding pressure of the plates 41 against the sides of the fish, may be varied quite materially from the exact mechanism herein illustrated. While now I prefer to use the mechanism described, I am aware that this may be widely varied and do not desire to be limited to the use of this mechanism alone. The mechanism herein illustrated and described has been so illustrated and described, merely as indicative of a mechanism which is suitable for accomplishing the results desired. I desire it understood that other and different mechanical means for securing these results may be substituted if desired.

In the operation of the fish cleaning machine, upon which this device is used, the fish before reaching this device have been, in the main, very well cleaned. They reach this device with the entrails well removed and presume to finish the job, it is only necessary to remove the small parts of the membrane which lines the abdominal cavity, small remnants of clotted blood which accumulate along the back bone and other little fragments which may have escaped the preliminary cleaning mechanisms. I have found that the use of this type of scraper head leaves very little to be removed by hand after the fish is discharged from the machine.

I have referred to the position of these cleaning devices as making an incline to the radius of the fish carrying rings. It would probably be better to refer to these as being inclined to a perpendicular from the path of movement of the fish. This path of movement in another type of machine might be a straight line.

One purpose of this inclination is to make it possible for the advancing movement of the fish, when it strikes the scraper head, to act in a measure to force the scraping mechanism outward or away from the path of the fish. If the direction of movement of the scraper head were perpendicular to the path of movement of the fish, the contact of the same with the fish would have no effect to force the head away from the fish, except as the fish itself might act as an incline to secure this result.

When, however, the scraper head is itself mounted so as to move in a direction which is inclined to this perpendicular, the contact of the fish therewith will act to move the head outward, irrespective of any effect produced by the position of the fish itself. In consequence, I find that the device is readily acted upon by the fish so as to be moved outward and at the same time maintains a soft and yielding pressure against the fish. I consider this inclination in the guides of the scraper heads as being a matter of some little importance.

It is believed that the operation of the device has been clearly set forth in the description thereof which has been herein given and therefore a detailed statement as to its method of operation is unnecessary.

What I claim as my invention is:

1. In a fish cleaning machine means for conveying a slit fish in the direction of its length, a scraper adapted to enter the abdominal cavity of the fish while passing, guiding supports for said scraper inclined from a perpendicular to the path of the fish with its outer end advanced in the direction of movement of the fish, and means for yieldingly holding said scraper to the fish.

2. The combination with a device as defined in claim 1 of pressers mounted to reciprocate with said scraper and yieldingly engaging the outer side surface of the fish to hold its flanks against the scraper.

3. A scraping attachment for fish cleaning machines comprising a body having transverse section adapted to fit the opened abdominal cavity of a fish and provided with a bluntly pointed fish-entering end, and scraping plates extending across said body and with their edges slightly projecting, means for holding said body yieldingly to the fish and means for yieldingly holding the flanks of the fish against the sides of said body.

4. In a fish cleaning machine, in combination, means for conveying a slit fish lengthwise of its body, a scraper adapted to fit between the flanks of the fish, and having scraping ribs projecting slightly therefrom, a guide mount for said scraper permitting movement in a line having its outer end slightly inclined from a perpendicular to the path of movement of the fish and in the direction of said movement, and means for yieldingly holding said scraper toward the fish.

5. A scraper for slitted fish comprising a body adapted to fit within the abdominal cavity of the fish and transversely divided into a plurality of sections, and scraping plates secured against the transverse faces of said sections and having their edges projecting slightly beyond the marginal outlines of said body.

6. A scraping attachment for fish cleaning machines comprising a scraping body adapted to enter the opened abdominal cavity of a fish in passing and having scraping edges extending transversely about it, two parallel guide bars extending therefrom away from the fish, guide pulleys engaging said bars to support them, and a spring acting to hold the scraper toward the fish.

7. A scraping attachment for fish cleaning machines comprising a scraping body adapted to enter the opened abdominal cavity of a fish, means for carrying the opened fish lengthwise past the scraper, parallel guide rods secured to the scraper and extending away from the fish in a direction outwardly inclined from a perpendicular to the direction of movement of the fish in the direction of said movement, and a spring acting to yieldingly hold said scraper to the fish.

8. In a fish cleaning machine the combination with a scraper and means for producing relative movement between the scraper and the fish, of guides for said scraper inclined from a perpendicular to the path of the fish in the direction of said movement, and means for yieldingly holding the scraper to the fish.

Signed at Seattle, Washington, this 21st day of March, 1919.

EDWARD H. WAUGH.